United States Patent [19]

Schmidhauser

[11] 4,266,122

[45] May 5, 1981

[54] METHOD AND APPARATUS FOR IDENTIFICATION OF DOCUMENTS

[75] Inventor: Rolf Schmidhauser, Cham, Switzerland

[73] Assignee: LGZ Landis & Gyr Zug AG, Zug, Switzerland

[21] Appl. No.: 112,904

[22] Filed: Jan. 17, 1980

[30] Foreign Application Priority Data

Jan. 31, 1979 [CH] Switzerland ............................. 929/79

[51] Int. Cl.³ .......................... G06K 7/14; G06K 19/06
[52] U.S. Cl. .................................... 235/454; 235/466; 235/494
[58] Field of Search .............. 235/494, 469, 457, 466, 235/454; 250/555, 569

[56] References Cited

U.S. PATENT DOCUMENTS

| | | | |
|---|---|---|---|
| 3,567,909 | 3/1971 | Allen | 235/469 |
| 3,887,793 | 6/1975 | Goodfinger et al. | 235/494 |
| 4,143,810 | 3/1979 | Greenway | 235/457 |
| 4,172,554 | 10/1979 | Clarinval et al. | 235/494 |

FOREIGN PATENT DOCUMENTS

2451939 5/1975 Fed. Rep. of Germany .
2731726 12/1978 Fed. Rep. of Germany .
2731727 1/1979 Fed. Rep. of Germany .

*Primary Examiner*—Daryl W. Cook
*Attorney, Agent, or Firm*—Ernest F. Marmorek

[57] ABSTRACT

In a method and apparatus of identifying a document with the aid of at least two different types of optically readable markings disposed on the document, and of at least two light sensors, each individual marking modifying light impinging thereon in a characteristic manner, and wherein each light sensor is associated with a respective marking, and senses the light modified by the associated marking, the steps include placing the markings in a predetermined cyclical sequence on at least one track of the document, so as to avoid the creation of any optically readable gap, thereafter erasing at least selected portions of the markings, while maintaining in selected groups of two adjacent markings at least a portion of one of the markings in dependence of coded information to be recorded on the document, obtaining a timing signal from the light sensors in dependence of the light modified by the markings, with the aid of the timing signal, serially reading out the coded information from the marking portions remaining on the document, and examining the read-out coded information from the remaining marking portions on the document.

7 Claims, 16 Drawing Figures

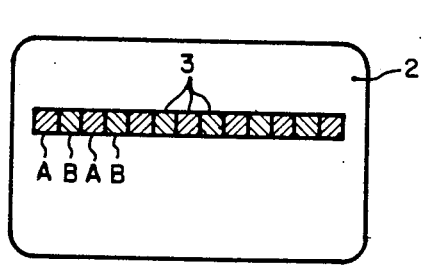
Fig. 1
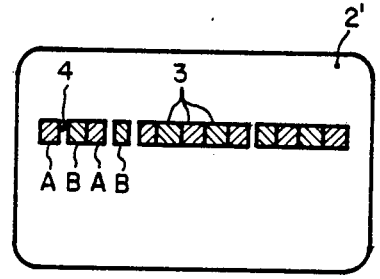
Fig. 2
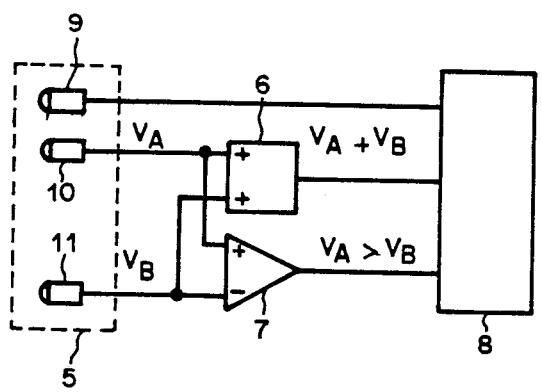
Fig. 3
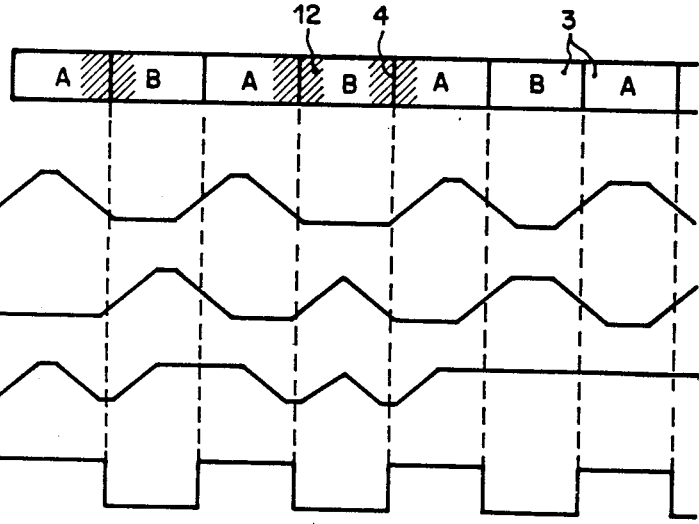
Fig. 4a
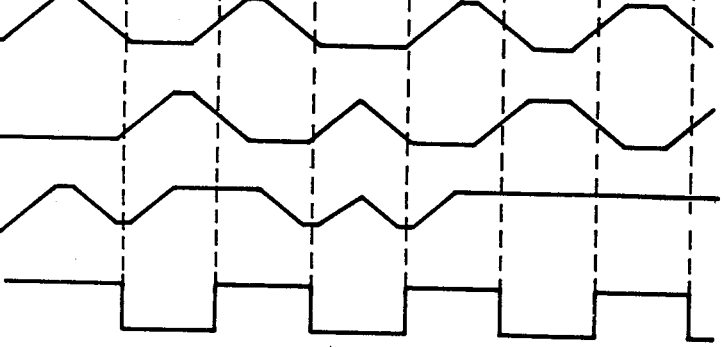
Fig. 4b $V_A$
Fig. 4c $V_B$
Fig. 4d $V_A + V_B$
Fig. 4e $V_A > V_B$

METHOD AND APPARATUS FOR IDENTIFICATION OF DOCUMENTS

CROSS-REFERENCE TO RELATED APPLICATIONS

Reference should be made to the application entitled: "Apparatus for cashless payment of Merchandise" filed by the applicant of the present invention, and assigned to the Assignee of the present invention.

BACKGROUND OF THE INVENTION

From Swiss Pat. No. 574,144 and the corresponding British Pat. No. 1,502,460, there has become known an apparatus for the cashless payment for goods or services, which employs payment means on which three are arranged markings, on several parallel tracks at a predetermined spacing from one another, which markings may be similar or different from one another. A transport mechanism not further described in detail moves the payment means past a reading head, and an erasing head. The transport means is stopped as soon as a valid marking is sensed below the reading head, and the payment or credit means is devalued by a unit in which the corresponding marking is erased. The arrangement of the markings spaced at a distance from one another has the disadvantage, that as a result of the vacant spaces between the individual markings, a portion of the available storage surface remains unused, so that the storage capacity of the payment means is inefficiently utilized.

From U.S. Pat. No. 4,108,367 there has become known payment means, in which each value unit is defined by two holograms. The hologram pairs are spaced at a distance from one another.

From German Pat. DE - OS No. 24 41 939 there has become known a code plate for characterizing objects. Each bit of information stored in the code plate is defined by a sequence of colors.

From German Pat. DE - OS No. 27 31 727, corresponding to U.S. patent application Ser. No. 913,222 of the Assignee of the instant application, there has become known a card using an information track, and a timing track. The timing track is formed by three types of markings, which follow one another without the occurrence of any gap.

Although it is therefore possible for the markings to follow one another without the occurrence of any gap, and to use an edge, or a separate starting mark of the payment means, as a local reference, to locate the erasing position, this would require a mechanically expensive transport device, which would be required to operate without any play, and to advance in steps of predefined lengths to avoid any malpositioning, and therefore any erroneous devaluations, or cancellations. If the payments means shrinks as a result of heat or the like applied thereto, it is still possible that malpositioning of the payment means may occur.

It is finally conceivable to provide a separate timing track, with the aid of which erasing positions can be located, and where the timing signal serves as a local reference. This does, however, require additional space on the payment means, increases the cost of manufacturing of the payment means, and also requires an additional reading head, inclusive of the associated electronic detection circuitry, for interrogating or scanning the markings on the payment means, serving as a timing reference.

SUMMARY OF THE INVENTION

One of the principal objects of the invention is therefore to utilize the storage space available as efficiently as possible, to dispense with a separate timing track, and to ensure that the erasing positions are located in an errorless manner, without placing any great demands on the transportation means.

Further objects and advantages of the invention will be set forth in the following Specification, and in part will be obvious therefrom without being specifically referred to, the same being realized and attained as pointed out in the claims hereof.

BRIEF DESCRIPTION OF THE DRAWING

For a fuller understanding of the nature and objects of the invention, reference should be had to the following detailed description, taken in connection with the accompanying drawings in which:

FIG. 1 is a plan view of an uncoded document;

FIG. 2 is a plan view of a coded document;

FIG. 3 is a block circuit diagram of an apparatus, according to the invention, for identifying the document;

FIG. 4a is a plan view of one track of coded information on the document;

FIG. 4b is the output signal obtained from a first light sensor;

FIG. 4c is the output signal obtained from a second light sensor;

FIG. 4d is the summed output signal from the first and second light sensors;

FIG. 4e is the output signal obtained from a comparator;

FIG. 7b is an output.from a first light sensor;

FIG. 7c is an output signal from a second light sensor;

FIG. 7d is an output signal from a first comparator;

FIG. 7e is an output signal from a second comparator; and

DESCRIPTION OF THE PREFERRED EMBODIMENTS

Figure 5:
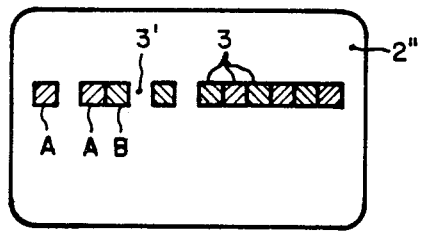
FIG. 5 shows another coded document.

In carrying the invention into effect, FIG. 1 is a plan view of a document 2, which may be an identity card, an admission card, a credit card, a negotiable instrument or the like. On the document there are disposed along at least one track a plurality of machine-readable optical markings 3, wherein each individual marking 3 modifies light impinging thereon in a characteristic manner by diffraction or refraction of a reflected or transmitting light ray, in an optical test apparatus further described below. The markings 3 may be, for example, holograms, diffraction gratings of kinoforms (described in "Optical Holography", p. 560–563, Academic Press, New York and London 1971), which represent information bearing on the authenticity of the document, which information is difficult to forge. In the example illustrated, there are $n=2$ types A and B, of different markings 3, which follow each other in a predetermined cyclical sequence, without the formation of any gap between adjacent markings.

Coded information is imparted onto the document 2 by subsequently erasing selected markings 3, or portions thereof. The erasure of these markings or portions thereof can be accomplished by thermal action, or any other known means. Care must be taken that when selected markings of a group of two adjacent markings are erased, that at least a portion of one of the markings is maintained.

FIG. 2 is a plan view of a document 2', where selected transition zones 4 between adjacent markings 3 have been erased in order to form a code. In a document 2" shown in FIG. 5, the entire surface of selected markings 3' have been erased to form a code, care having been taken that in a group of two adjacent markings 3 at least one of the markings has been retained.

A schematic block diagram of an apparatus for identifying the document 2' is shown in FIG. 3, and includes substantially a reading head 5, a summer 6, a comparator 7, and an evaluating circuit 8. The reading head 5 includes a light source 9, which transmits a light ray onto a region of the data track of the document 2', which is immediately below the reading head 5. The reading head 5 further includes n light sensors, in the example described, light sensors 10 and 11, wherein each light sensor is arranged to respond to a respective marking A or B. The light sensor 10 may generate an electrical signal $V_A$, and the light sensor 11 may generate an electrical signal $V_B$. Both light sensors 10 and 11 are connected to the summer 6, and to the comparator 7. The summer 6 generates a sum signal $V_A+V_B$, and the comparator 7 generates a binary signal $V_A>V_B$.

FIG. 4a is an enlarged view of the data track showing the markings A and B. The erased surfaces 12 within the region of the transition zones 4 are shown diagonally hatched. In the example illustrated, the entire width of the erased surfaces 12 amounts to approximately one-half the width of the markings 3, so that both the erased surfaces 12, as well as the remaining non-erased surfaces of the markings 3 are sufficiently wide to permit reliable detection.

FIG. 4b shows the signal $V_A$, FIG. 4c the signal $V_B$, FIG. 4d the sum signal $V_A+V_B$, and FIG. 4e the binary signal $V_A>V_B$.

If the reading head 5 passes along the data track of the document 2', as a result of manual actuation or actuation by a (non-illustrated) transport mechanism, due to relative motion of the data track and the reading head 5, and passes a marking 3 of the type A, then the signal $V_A$ first increases, and then decreases again. This also applies to the signal $V_B$. Due to the finite width of the optically active surface of the reading head 5, the leading and trailing edges of the signals $V_A$ and $V_B$ are relatively shallow. The aforesaid width is so chosen, that upon scanning of an erased transition 4 the trailing edge of, for example, the signal $V_A$, overlaps somewhat the leading edge of the signal $V_B$. Consequently the binary signal $V_A>V_B$ changes its logical state always at a point which coincides with either an erased, or a non-erased transition 4, and therefore represents a timing signal, which may serve for the purpose of reading out the coded information. In an evaluating circuit 8 there are determined at the time of the switch-over of the binary signal $V_A>V_B$, the bit values of the sum signal $V_A+V_B$. If the peak of the sum signal $V_A+V_B$ is above a predetermined threshold at the aforesaid switch-over time, then this is interpreted by the evaluating circuit 8 as a non-erased transition 4, otherwise it is interpreted as an erased transition 4. Based on the so readout coded information, the document 2' is identified, or rejected.

The advantage of the invention will now be easily recognized. As a timing signal can be obtained from the signals $V_A$ and $V_B$ for reading out the coded information, neither a separate timing track on the document 2', nor a predetermined relative velocity or a step motion between the reading head 5 and the document 2' is required. This simplifies considerably the manufacture of the document 2'; furthermore any transport mechanism can be built up from very simple means, and an errorfree reading out of the information is also ensured, if the document 2 changes in length, as the result of, for example, being subject to heat, and the markings 3 can be dimensioned to be considerably smaller in relation to known types, so that a consequently higher storage density is obtained.

The simplest solution is obtained if n=2. If n=3, then based on the signals of the n light sensors, the direction of reading can be detected by known methods described in German Patent DE-OS No. 27 31 727, which is an advantage, if the identification apparatus is devoid of any transport means, and if the document has to be manually moved during reading out of the code. As the number of different markings increases, the security with respect to forgeries increases commensurately.

Figure 6:
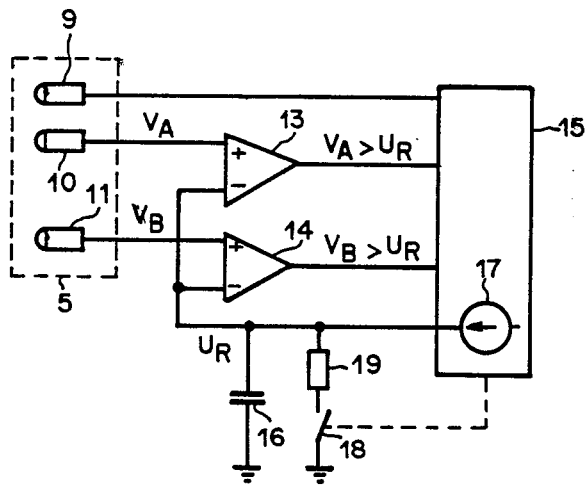
FIG. 6 is a block circuit diagram of an apparatus for identifying the document of FIG. 5.

The identification apparatus for the document 2', shown in FIG. 5, is shown in FIG. 6; it includes substantially a reading head 5, comparators 13 and 14, and an evaluation circuit 15. The light sensor 10 is connected to a first input of the comparator 13, and the light sensor 11 is connected to a first input of the comparator 14. A reference voltage $U_R$, which has a value about one-third of the peak value of the signals $V_A$ and $V_B$, is connected to a second input of each comparator 13 and 14. In the example illustrated, the reference voltage $U_R$ is supplied by a capacitor 16, which may be charged by a current source 17, and discharged via a switch 18, and a resistor 19.

Figure 7A:
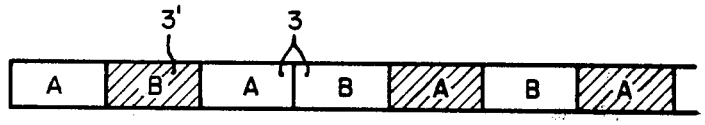
FIG. 7a is a plan view of one track of the document shown in FIG. 5.
Figure 6:
Figure 6:
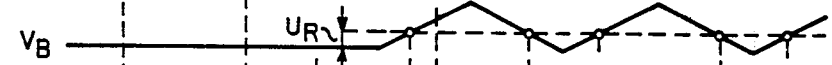
Figure 6:
Figure 6:
Figure 7F:
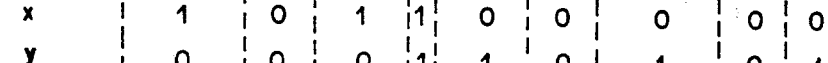
FIG. 7f is a coded output signal obtained from the evaluating circuit of the block diagram of FIG. 6.

FIG. 7a shows a data track of the document 2' on an enlarged scale. The course of the signals $V_A$ and $V_B$ can be seen in FIGS. 7b and 7c for the case where the width of the optically effective surface of the reading head 5 is equal to that of the markings 3. At the output of the comparator 13 there is generated a binary signal $V_A>U_R$ (FIG. 7d), and at the output of the comparator 14 there is generated binary signal $V_B>U_R$ (FIG. 7e). The bit combinations (x, y) of the binary signals $V_A>U_R$, and $V_B>U_R$ are shown in FIG. 7f. When scanning a marking 3 of the type A, there is generated the bit combination (1, 0), when scanning a marking of the type B, there is generated the bit combination (0, 1), and when scanning an erased marking, there is generated the bit combination (0, 0). The bit combination (1, 1) is characterized by transition of a marking 3 from one type to another type. The coded information obtained from these bit combinations is read out from the evaluation circuit 15. As a result of the already mentioned choice of the magnitude of the reference voltage $U_R$, there is ensured a reliable discrimination of a transition from one type of marking 3, characterized by the bit combination (1, 1), to another type of (erased) marking 3' characterized by the bit combination (0, 0).

It is advantageous if the reference voltage $U_R$ is redetermined each time the document 2" is scanned, by obtaining a reference value with the aid of the light sensors 10 and 11 from the document, and by storing this reference value in digital or analog form in a reference value memory. By this means it is ensured that the coded information is read out in an error-free manner, even in the case of aged or contaminated documents, or in the case of any change in the sensitivity of the reading head 5, or the like. In the example illustrated, the reference value is obtained by means of the light sensor 10 from the first marking of the type A. When this marking is scanned, the capacitor 16 is charged by means of the current source 17 until $U_R = V_{Amax}$, where $V_{Amax}$ is equal to the peak value of the signal $V_A$, at which point the comparator 13 is switched over. Following this phase, a switch 18, controlled by the evaluating circuit 15, remains closed for a predetermined and selected time, so that the capacitor 16 can be discharged via the switch 18, and the resistor 19 to one-third of its voltage value, so that after the switch 18 has been opened, the capacitor furnishes a reference voltage $U_R = \frac{1}{3} V_A$.

Erasure of the transitions 4 (FIG. 4a) has the advantage, vis-a-vis erasure of the whole, or entire surfaces of the markings 3' (FIG. 7a), of yielding a higher number of different coding combinations. On the other hand, when entire surfaces of the markings 3' are erased, the tolerance requirements are lower, so that in this method a higher storage density can be obtained.

I wish it to be understood that I do not desire to be limited to the exact details of construction shown and described, for obvious modifications will occur to a person skilled in the art.

Having thus described the invention, what I claim as new and desire to be secured by letters patent is as follows:

1. In a method of identifying a document with the aid of at least two different types of optically readable markings disposed on said document, and of at least two light sensors, each individual marking modifying light impinging thereon in a characteristic manner by diffraction or refraction, each light sensor being associated with a respective marking, and sensing the light modified by the associated marking,
   the steps comprising:
   placing said different types of markings in a predetermined cyclical sequence on at least one track of said document so as to substantially avoid the creation of any optically readable gap between adjacent markings,
   thereafter erasing at least selected portions of said markings, while
   maintaining in selected groups of two adjacent markings at least a portion of one of said adjacent markings, in dependence of coded information to be recorded on said document,
   obtaining a timing signal from said light sensors in dependence of the light modified by said markings, and sensed by said light sensors,
   with the aid of said timing signal, serially reading out the coded information from the marking portions, remaining on the document, and
   examining the read-out coded information obtained from the portions of said markings remaining on said document.

2. In a method as claimed in claim 1, wherein the coded information to be recorded on said document bears on the authenticity of said document, and wherein examining the read-out coded information includes the step of passing on the authenticity of said document.

3. In a method as claimed in claim 1, wherein a transition zone is formed between said adjacent markings, and further comprising the step of erasing selected transition zones in dependence of said coded information.

4. In a method as claimed in claim 1, wherein selected markings extend over a predetermined surface part of said document, and further comprising the step of erasing said predetermined surface part less any portion maintained thereon, where the selected markings include said adjacent markings.

5. An apparatus adapted for identifying a document with the aid of at least two different types of optically readable markings disposed on said document, each individual marking modifying light impinging thereon in a characteristic manner by diffraction or refraction,
   comprising in combination:
   at least two light sensors, each light sensor providing an output signal in response to the light modified by the type of marking associated therewith,
   transport means for generating relative motion between each light sensor and said markings,
   summing means having an output for providing summing signals, and inputs connected to said light sensors,
   comparator means having an output for providing comparative signals, and inputs connected to said light sensors, for receiving the output signals of said light sensors,
   evaluating circuit means having inputs connected to the outputs of said summing means and of said comparator means for providing an evaluating signal, and for receiving said summing signals and said comparative signals, and for assigning bit values to said evaluating signal in dependence of the relative magnitudes of said summing signals and of said comparative signals.

6. An apparatus adapted for identifying a document with the aid of at least two different types of optically readable markings disposed on said document, each individual marking modifying light impinging thereon in a characteristic manner by diffraction or refraction,
   comprising in combination:
   at least two light sensors, each light sensor providing an output signal in response to the light modified by the type of marking associated therewith,
   transport means for generating relative motion between each light sensor and said markings,
   first comparator means having an output for providing first comparative signals, a first input connected to one of said light sensors for receiving the output signal thereof, and a second input,
   second comparator means having an output for providing second comparative signals, a first input connected to the other of said light sensors for receiving the output signal thereof, and a second input,
   a reference voltage source for providing a reference voltage, and connected to the second inputs of said comparator means, and
   evaluating circuit means having inputs connected to the outputs of said comparator means for receiving said first and second comparative signals, and for providing a coded signal in dependence of said first and second comparative signals.

7. An apparatus as claimed in claim 6, wherein at least one of said light sensors derives a reference value from said document, and further comprising reference value storage means for storing said reference value, and wherein said reference voltage is determined by said reference value.

* * * * *